Sept. 2, 1952      T. R. BUSH      2,609,016
ELECTRIC MOTOR DRIVEN JIG-SAW UNIT
Filed Aug. 3, 1949      2 SHEETS—SHEET 1
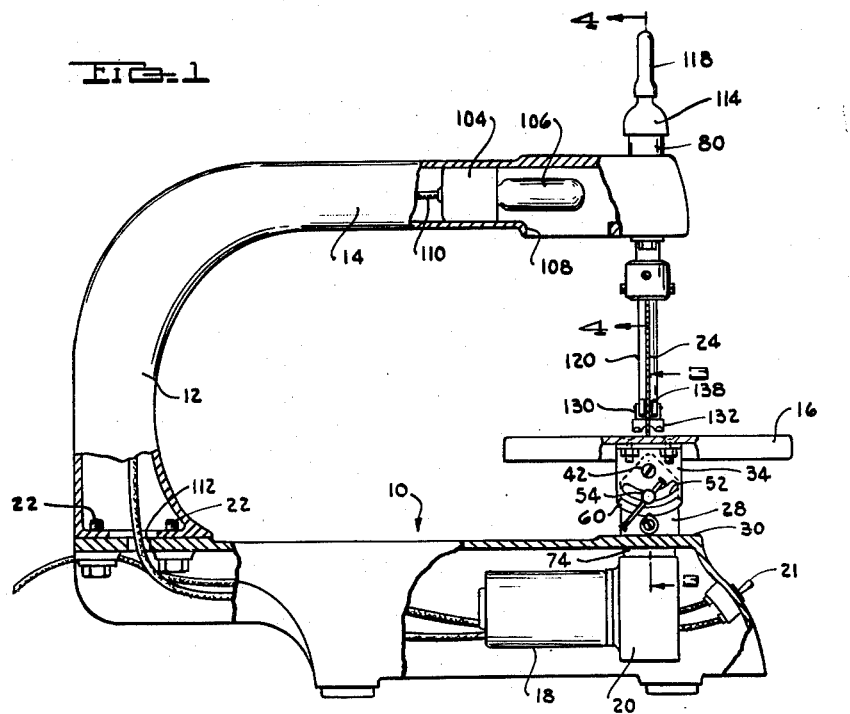
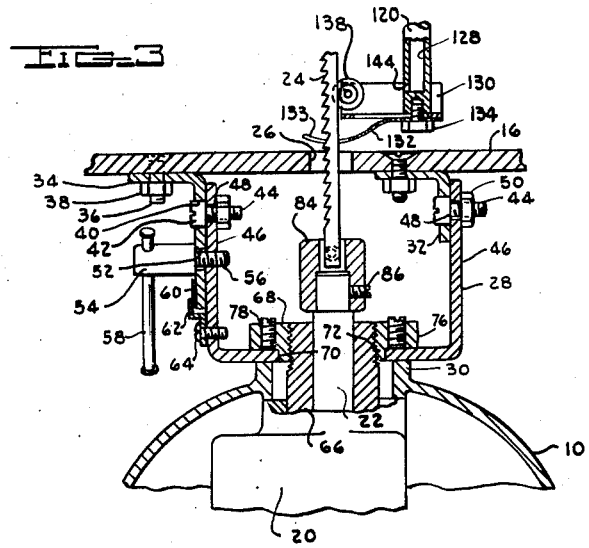
INVENTOR.
THEODORE R. BUSH
BY
ATTORNEY Sept. 2, 1952  T. R. BUSH  2,609,016
ELECTRIC MOTOR DRIVEN JIG-SAW UNIT
Filed Aug. 3, 1949  2 SHEETS—SHEET 2
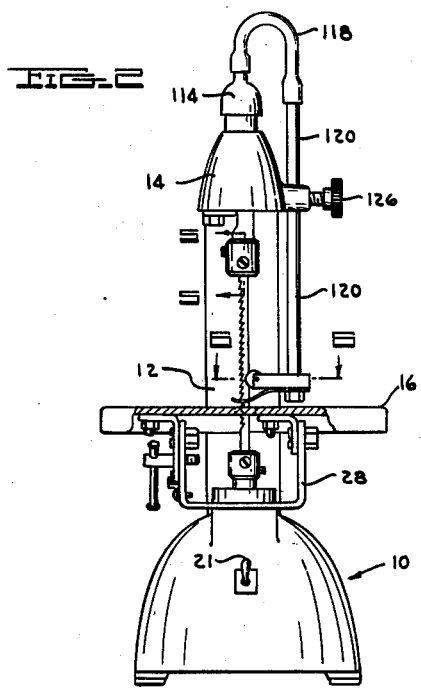
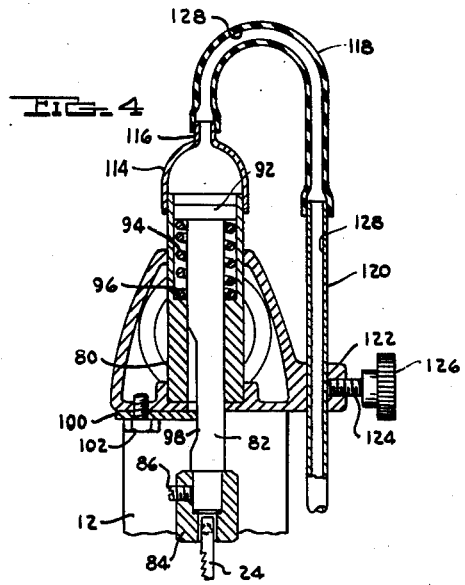
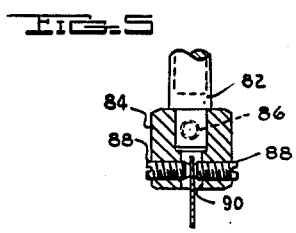
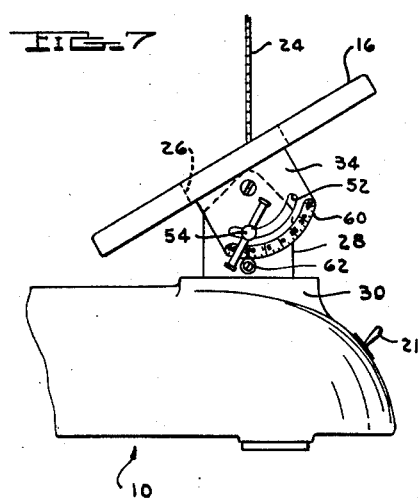
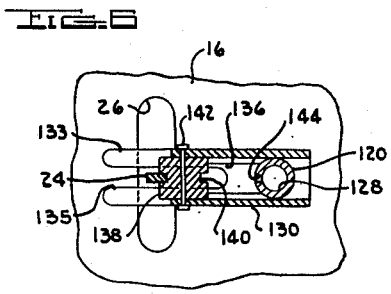
INVENTOR.
THEODORE R. BUSH
BY
ATTORNEY Patented Sept. 2, 1952

2,609,016

UNITED STATES PATENT OFFICE 2,609,016

ELECTRIC MOTOR DRIVEN JIG-SAW UNIT

Theodore R. Bush, Royal Oak, Mich.

Application August 3, 1949, Serial No. 108,273

2 Claims. (Cl. 143—70)

This invention relates to a motor driven woodworking machine and has particular reference to new and useful improvements in such machines.

It is a primary object of the invention to provide a new and improved method of supplying a blast of air to the work piece which is supported upon the worktable of the machine so that such work piece will be kept free from sawdust, chips and other such material.

Another object of the invention is to provide in a machine of this type a compact unit wherein the electric driving motor and the reciprocating mechanism for the machine are mounted within a hollow base, thereby eliminating the usual belt and pulleys found in machines of this type.

Another object of the invention is to provide an improved universal mounting for the worktable of the machine.

Other and further objects of the invention will be apparent from the following description and claims and will be understood by reference to the accompanying drawings, of which there are two sheets, which by way of illustration show a preferred embodiment and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims.

In the drawings:

Fig. 1 is a side elevational view of the invention with certain portions broken away;

Fig. 2 is a front elevational view;

Fig. 3 is a partial sectional view taken along the lines 3—3 of Fig. 1;

Fig. 4 is a sectional view taken along the lines 4—4 of Fig. 1;

Fig. 5 is a sectional view taken along the lines 5—5 of Fig. 2;

Fig. 6 is a sectional view taken along the lines 6—6 of Fig. 2; and

Fig. 7 is a fragmentary side elevation of the device showing the worktable tilted.

A woodworking machine of the type contemplated by this invention comprises a hollow cast iron base indicated generally at 10, a vertical column 12 and a horizontally extending arm 14, a universally mounted worktable 16, an electric motor 18, and reciprocating mechanism 20.

The vertical column 12 is supported on one end of the base 10 by means of bolts 22. The arm 14 is formed integrally with the vertical column 12 and is arranged to overlie the worktable 16. The electric motor 18 and the reciprocating mechanism 20 are bolted together and are secured within the hollow base 10, thereby eliminating the necessity for the usual belts and pulleys found in machines of this type. A toggle switch 21 is provided on the base 10 for operation of the motor 18. The motor 18 and the mechanism 20 may be of any standard type which will permit rapid reciprocating movement of a plunger projecting from the mechanism 20. As is clearly shown in Fig. 3, the plunger 22 of the reciprocating mechanism 20 projects vertically above the upper surface of the base 10. The arm 14 is provided with means at the free end thereof cooperating with the plunger 22 for reciprocating a woodworking tool 24 through an opening 26 in the table 16 upon operation of the motor 18.

As is best shown in Figs. 1, 3 and 7, the mounting means for the table 16 consists of a channel-shaped member 28 which is seated upon a boss 30 on the base 10. Brackets 32 and 34 are secured to the under side of the table 16 by means of screws 36 and nuts 38. The brackets 32 and 34 are apertured at 40 to accommodate the head 42 of a round-headed screw 44. The parallel slides 46 of the channel-shaped member 28 have apertures 48 in alignment with the holes 40 in the brackets 32 and 34. A nut 50 cooperates with the screw 44 to pivotally secure the brackets to the channel-shaped member 28. The head 42 of the screw 44 is free to turn within the holes 40 provided in the brackets 32 and 34.

Bracket 34 is provided with an arcuate slot 52. A handle 54 is provided with a threaded portion 56 which cooperates with one of the sides 46 to secure the bracket 34 to the side 46. The handle 54 is provided with a pin 58 to facilitate adjustment of the handle 54. Thus it will be seen that when the handle 54 is tightened by means of the threaded portion 56, no movement of the brackets 32 and 34 with respect to the channel member 28 will be permitted.

A plate 60 is secured to the lower end of the bracket 34 and is provided with markings in degrees so that the table 16 may be tilted to any desired angle from 0° to 45° and then secured at such tilted position by means of the handle 54. A pointer 62 is secured to the side 46 by means of a screw 64 and cooperates with the markings on the plate 60 so that the table may be accurately adjusted.

The reciprocating mechanism 20 is provided with a plunger 22 which reciprocates through a bushing 66 which is rigidly secured to the mechanism 20. A nut 68 is threadedly secured to the end of the bushing 66. The channel-shaped member 28 has a central opening 70 therein through which the neck 72 of the nut 68 projects. As the nut 68 is threaded upon the bushing 66, it will be seen that the reciprocating mechanism 20 will be held tightly against the surface 74 of the base 10. The nut 68 provides the only means for mounting the reciprocating mechanism 20 and the electric motor 18 within the hollow base 10, and thus it will be seen that the motor 18 and the mechanism 20 may be easily removed if any repairs or adjustment is necessary.

The head 76 of the nut 68 when the nut 68 has been fully tightened on the bushing 66, is arranged to seat loosely on the bottom wall of the channel member 28 so that the member 28 may be rotated a complete 360° around the neck 72 of the nut 68. Setscrews 78 are provided to securely clamp the channel member 28 against the base 10 so that the table may be rotated to any angular position desired and then secured in such position by means of the screws 78.

It will be seen from the foregoing description that any desired position of the table 16 may be obtained up to 45° of inclination by the simple loosening and then tightening of screws 78 and the handle 54.

The arm 14 at the free end thereof is provided with a cylinder 80 and a piston member 82 which may be reciprocated within the cylinder 80. The piston 82 and the plunger 22 are each provided with a chuck 84. The chucks 84 are secured to the piston 82 and the plunger 22 by means of screws 86. The chucks 84 are also provided with aligned screws 88 for securing the end of a woodworking tool 24 within the chucks 84. The opening 90 in each of the chucks 84 is sufficiently large to receive not only a saw blade as illustrated in the drawings, but other woodworking tools such as sanding sticks or files.

The piston 82 is provided with an enlarged head 92. A spring 94 is confined between the head 92 and an annular shoulder 96 within the cylinder 80 so that the piston 82 is biased away from the plunger 22 thereby putting the proper amount of tension on the woodworking tool 24. The piston 82 is provided with a flat surface 98. A plate 100 is secured to the under side of the arm 14 by means of a screw 102, and the plate 100 cooperates with the flat surface 98 to prevent rotation of the piston 82 within the cylinder 80.

The vertical column 12 and the arm 14 are hollow, and a light socket 104 is secured within the arm 14 adjacent the forward end thereof. A bulb 106 is provided for the socket 104 above an opening 108 in the arm 14. The bulb 106 is also operable by the toggle switch 21. The cord 110 for the bulb 106 extends through the hollow arm 14 and the vertical column 12 and through an opening 112 in the base 10 to the toggle switch 21.

A hollow cap 114 is secured to the upper end of the cylinder 80 and is provided with a neck 116. A flexible hose 118 is fitted over the neck 116, and a hollow tube 120 is inserted into the other end of the hose 118. The arm 14 is provided with a laterally extending boss 122 through which the tube 120 extends. A screw 124 having a head 126 is threaded into the boss 122 for detachably securing the tube 120 to the boss 122. The hose 118 and the tube 120 provide a duct 128 through which a blast of air may be forced upon reciprocating movement of the piston 82 within the cylinder 80. The lower end of the tube 120 is provided with a saw guide 130 and a work holddown 132. The saw guide 130 and the work holding member 132 are secured to the end of the tube 120 by means of a screw 134. The saw guide 130 is channel shaped in cross section and provided with an elongated slot 136 in the bottom wall so that the channel-shaped member 130 may be adjusted toward or away from the woodworking tool 24. The work holding member 132 has a downwardly curved end 133, and a slot 135 is provided in the end 133 of the member 132. The end 133 straddles the woodworking tool 24 and is adapted to springably hold the work on the worktable 16 in any position of the table 16.

A circular guide 138 having an annular groove 140 is secured between the parallel sides of the channel member 130 by means of a pin 142. When a saw blade is used in the operation of the machine the channel member 130 may be moved toward the blade by means of the elongated slot 136 until the back edge of the blade is seated within the groove 140 to provide a means for guiding the reciprocating movement of the blade and preventing the blade from becoming bent or distorted while in use.

The tube 120 is provided with an aperture 144 at the lower end thereof in communication with the duct 128. As the piston 82 moves upwardly within the cylinder 80, the air within the duct 128 will be compressed and a blast of air will be discharged through the aperture 144. The aperture 144 is directed slightly downward so that the air discharged therefrom will be directed toward the bottom of the channel member 130. The parallel sides of the member 130 cooperate with the aperture 144 to direct the blast of air downwardly through the elongated slot 136 and upon the work piece located on the table 16 so as to keep the work free from sawdust or chips. Since the tube 120 serves as an adjustable means for securing the saw guide 130 and work holding member 132 and at the same time provides a means for conveying a blast of air to the work, it will be seen that no interference from the usual air hose and clamps therefor is present.

While I have illustrated and described a preferred embodiment of my invention, it is understood that this is capable of modification, and I therefore do not wish to be limited to the precise details set forth but desire to avail myself of such changes and alterations as fall within the purview of the following claims.

I claim:

1. In an electric motor driven woodworking machine, a hollow base provided with a horizontal surface having an opening therein, a bracket having a flat portion provided with an opening and seated on said surface, a worktable mounted on said bracket, a drive unit arranged within said hollow base and comprising an electric motor and reciprocating mechanism driven thereby and secured thereto, said drive unit including an externally threaded bushing projecting upwardly through said openings in said base and said bracket, said reciprocating mechanism including a plunger reciprocable in said bushing for reciprocating a woodworking tool through an opening in said table upon operation of said motor, a nut threaded onto said bushing and having a reduced neck portion projecting through the opening in said bracket, said nut providing a means for securing said drive unit to said base, said flat portion of said bracket being arranged between said base and the head of said nut and being rotatable about said reduced portion of said nut, and other threaded means extending through said head of said nut and engageable with said flat portion of said bracket for clamping said bracket against said base so as to prevent rotation of said bracket and table.

2. In an electric motor driven woodworking machine, a hollow base, a worktable, means for mounting said table on said base comprising a U-shaped bracket seated on said base, said table being pivotally secured to said bracket so as to permit tilting movement of said table, a drive unit arranged within said hollow base and comprising an electric motor and reciprocating mechanism driven thereby and secured thereto, said drive unit including a bushing projecting upwardly through said base and said bracket, said reciprocating mechanism including a plunger reciprocable in said bushing for reciprocating a woodworking tool through an opening in said table upon operation of said motor, threaded means engageable with said bushing for securing said drive unit to said base, said bracket and said table being rotatable about said threaded means, said threaded means having other threaded means associated therewith and engageable with said bracket for clamping said bracket against said base so as to prevent rotation of said bracket and said table.

THEODORE R. BUSH.

REFERENCES CITED

The following references are of record in the file of this patent:

UNITED STATES PATENTS

| Number | Name | Date |
|---|---|---|
| 45,981 | Doane | Jan. 24, 1865 |
| 126,580 | Sanford | May 7, 1872 |
| 149,952 | Patullo | Apr. 21, 1874 |
| 1,839,647 | Combs | Jan. 5, 1932 |
| 2,074,976 | Beardsley | Mar. 23, 1937 |
| 2,165,002 | Ocenasek | July 4, 1939 |
| 2,327,239 | Bartlett | Aug. 17, 1943 |
| 2,453,899 | Gaines | Nov. 16, 1948 |

FOREIGN PATENTS

| Number | Country | Date |
|---|---|---|
| 411,927 | Great Britain | June 21, 1934 |
| 243,404 | Switzerland | Dec. 16, 1946 |